United States Patent
Lee et al.

(10) Patent No.: US 8,843,167 B2
(45) Date of Patent: Sep. 23, 2014

(54) METHOD AND USER EQUIPMENT FOR TRANSMITTING UPLINK SIGNAL, AND METHOD AND BASE STATION FOR RECEIVING UPLINK SIGNAL

(75) Inventors: Moonil Lee, Anyang-si (KR); Jaehoon Chung, Anyang-si (KR); Hyunsoo Ko, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 404 days.

(21) Appl. No.: 13/270,349

(22) Filed: Oct. 11, 2011

(65) Prior Publication Data

US 2012/0088534 A1   Apr. 12, 2012

Related U.S. Application Data

(60) Provisional application No. 61/392,007, filed on Oct. 11, 2010.

(51) Int. Cl.
| | |
|---|---|
| *H04B 7/00* | (2006.01) |
| *H04B 7/04* | (2006.01) |
| *H04B 7/06* | (2006.01) |
| *H01Q 1/24* | (2006.01) |
| *H04W 8/24* | (2009.01) |
| *H04W 48/16* | (2009.01) |
| *H04W 88/02* | (2009.01) |

(52) U.S. Cl.
CPC ............ *H04B 7/0404* (2013.01); *H04B 7/0452* (2013.01); *H04B 7/0413* (2013.01); *H04B 7/0628* (2013.01); *H04B 7/0691* (2013.01); *H04W 8/24* (2013.01); *H04W 48/16* (2013.01); *H04W 88/02* (2013.01); *H01Q 1/246* (2013.01)

USPC ........... 455/509; 455/507; 455/517; 455/500; 455/575.8; 455/553.1; 370/310; 370/328; 370/329; 370/343; 370/338

(58) Field of Classification Search
CPC ... H04B 7/0452; H04B 7/0404; H04B 7/0413
USPC ................. 455/509, 507, 517, 500, 445, 561, 455/562.1, 550.1, 552.1, 553.1, 426.1, 455/426.2, 403, 422.1, 90.3, 575.1, 575.8; 370/310, 328, 329, 343, 338
See application file for complete search history.

(56) References Cited

U.S. PATENT DOCUMENTS

| | | | |
|---|---|---|---|
| 6,526,291 B1 * | 2/2003 | Ekstrom et al. | 455/562.1 |
| 7,426,199 B2 * | 9/2008 | Sondur et al. | 370/332 |
| 2008/0247488 A1 * | 10/2008 | Li et al. | 375/299 |

* cited by examiner

*Primary Examiner* — Keith Ferguson
(74) *Attorney, Agent, or Firm* — Morgan, Lewis & Bockius LLP

(57) ABSTRACT

A method for transmitting, at a user equipment having N (N being an integer greater than 1) transmission antennas, an uplink signal to a base station and a method for receiving, at the base station, an uplink signal from the user equipment are disclosed. The base station transmits reception capability information of the base station to the user equipment. Reception capability information includes information indicating that the base station may receive a signal transmitted through a maximum of M (M being an integer greater than 1) transmission antennas. The user equipment transmits the uplink signal using N transmission antennas if N is not greater than M and transmits the uplink signal using M transmission antennas if N is greater than M.

6 Claims, 4 Drawing Sheets

METHOD AND USER EQUIPMENT FOR TRANSMITTING UPLINK SIGNAL, AND METHOD AND BASE STATION FOR RECEIVING UPLINK SIGNAL

This application claims the benefit of U.S. Patent Application No. 61/392,007, filed on Oct. 11, 2010, which is hereby incorporated by reference as if fully set forth herein.

BACKGROUND OF THE INVENTION

1. Field of the Invention

The present invention relates to a wireless communication system, and more particularly, to a method of configuring a transmitter in consideration of reception capabilities of a base station at a user equipment having a plurality of transmission antennas.

2. Discussion of the Related Art

Recently, as capabilities and throughput of a wireless communication system have been maximized, a multiple input multiple output (MIMO) system is attracting considerable attention. MIMO technology employs multiple transmission antennas and multiple reception antennas so as to improve transmission/reception efficiency, instead of a conventional method using one transmission antenna and one reception antenna.

In particular, with development of wireless communication technology, the number of transmission antennas supported by a user equipment has been increased. Accordingly, it is necessary to configure a base station to receive signals from a user equipment having various numbers of antennas. However, implementation of such a base station causes extremely high receiver complexity. If reception capabilities of the base station do not match transmission capabilities of the user equipment, the base station may not receive the signal from the user equipment. Alternatively, in order to enable the base station to receive the signals from the user equipment, the user equipment may operate with minimum transmission capabilities. As a result, performance or throughput of a wireless communication system is deteriorated.

SUMMARY OF THE INVENTION

Accordingly, the present invention is directed to a method and user equipment for transmitting an uplink signal and a method and base station for receiving an uplink signal that substantially obviate one or more problems due to limitations and disadvantages of the related art.

An object of the present invention is to provide a method and apparatus for solving mismatch between reception capabilities of a base station and transmission capabilities of a user equipment.

Another object of the present invention is to provide a method and apparatus capable of decreasing receiver complexity of a base station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting, at a user equipment having N (N being an integer greater than 1) transmission antennas, an uplink signal to a base station, includes receiving, from the base station, reception capability information of the base station, the reception capability information including information indicating that the base station may receive a signal transmitted through a maximum of M (M being an integer greater than 1) transmission antennas, and transmitting the uplink signal using N transmission antennas if N is not greater than M and transmitting the uplink signal using M transmission antennas if N is greater than M.

In another aspect of the present invention, a method for receiving, at a base station, an uplink signal from a user equipment having N (N being an integer greater than 1) transmission antennas, includes transmitting reception capability information of the base station to the user equipment, the reception capability information including information indicating that the base station may receive a signal transmitted through a maximum of M (M being an integer greater than 1) transmission antennas, and configuring at least one of a first receiver for receiving the uplink signal transmitted through one transmission antenna, a second receiver for receiving the uplink signal transmitted through two transmission antennas, . . . , and an M-th receiver for receiving the uplink signal through M transmission antennas.

In another aspect of the present invention, a user equipment which has N (N being an integer greater than 1) transmission antennas and transmits an uplink signal to a base station, includes a transmitter, a receiver, and a processor configured to control the transmitter and the receiver, wherein the processor controls the receiver to receive, from the base station, reception capability information of the base station, the reception capability information including information indicating that the base station may receive a signal transmitted through a maximum of M (M being an integer greater than 1) transmission antennas, and wherein the processor controls the transmitter to transmit the uplink signal using N transmission antennas if N is not greater than M and controls the transmitter to transmit the uplink signal using M transmission antennas if N is greater than M.

In another aspect of the present invention, a base station which receives an uplink signal from a user equipment having N (N being an integer greater than 1) transmission antennas, includes a transmitter, a receiver, and a processor configured to control the transmitter and the receiver, wherein the processor controls the transmitter to transmit reception capability information of the base station to the user equipment, the reception capability information including information indicating that the base station may receive a signal transmitted through a maximum of M (M being an integer greater than 1) transmission antennas, and wherein the processor controls the receiver to configure at least one of a first receiver for receiving the uplink signal transmitted through one transmission antenna, a second receiver for receiving the uplink signal transmitted through two transmission antennas, . . . , and an M-th receiver for receiving the uplink signal through M transmission antennas.

The user equipment may transmit information indicating N which is the number of transmission antennas of the user equipment to the base station.

The user equipment may configure an N-th receiver if N is not greater than M and configure an M-th receiver if N is greater than M.

The user equipment may transmit the uplink signal to the base station using the configured transmitter.

The base station may receive the uplink signal from the user equipment using the configured receiver.

According to the present invention, even when reception capabilities of the base station do not match transmission capabilities of the user equipment, the user equipment may not operate with minimum transmission capabilities.

According to the present invention, it is possible to decrease receiver complexity of the base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
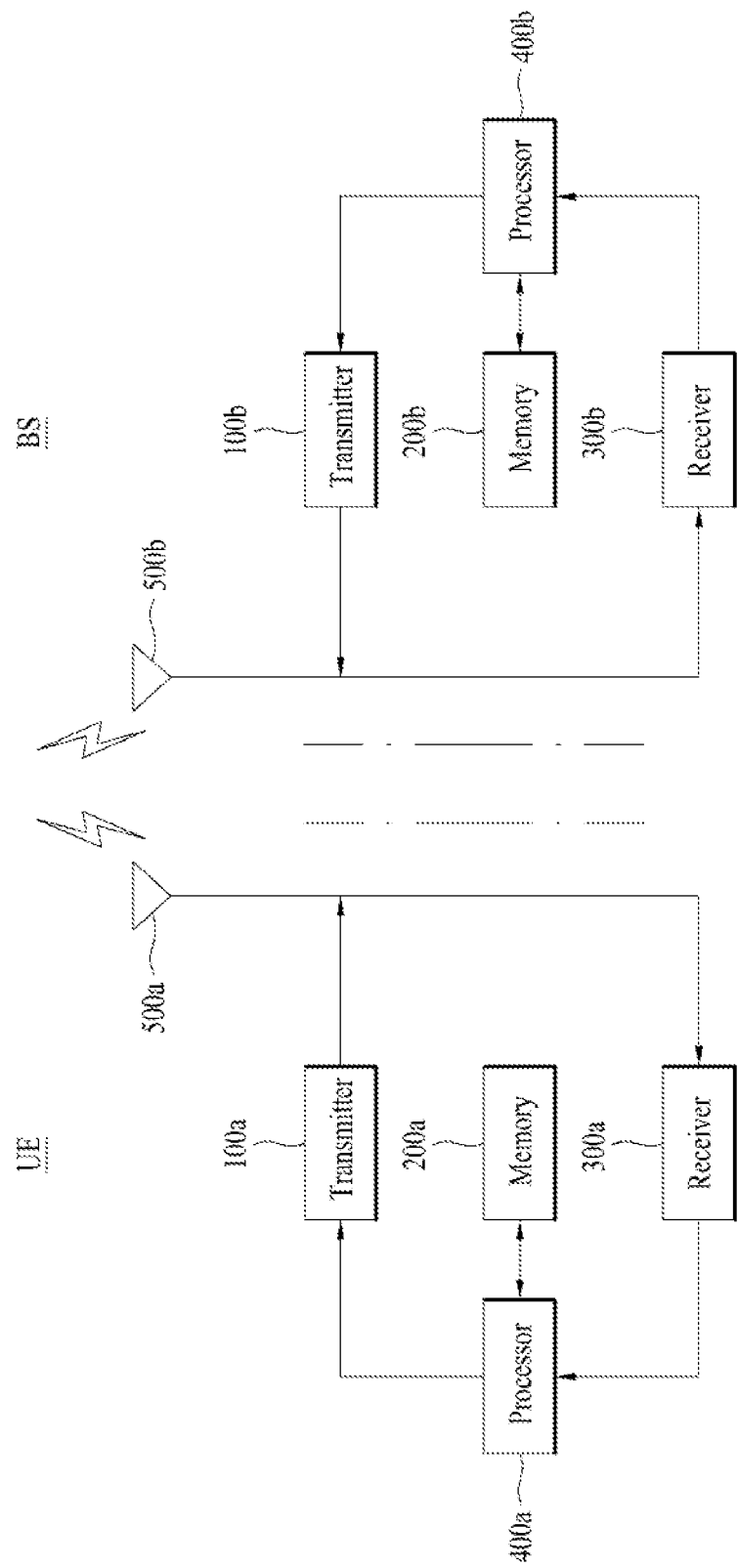
FIG. 1 is a block diagram showing the configuration of a user equipment (UE) and a base station (BS) according to the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b.

The signal processing procedure of the receivers 300a and 300b is the reverse of the signal processing procedure of the transmitters. Specifically, the receivers 300a and 300b perform decoding and demodulation of wireless signals received from the outside through the antennas 500a and 500b and deliver the resulting signals to the corresponding processors 400a and 400b. Each of the antennas 500a and 500b connected to the receivers 300a and 300b may include $N_r$ reception antennas. Each of the signals received through the reception antennas is reconstructed into a base band signal and is then reconstructed into a data stream, which was originally intended to be transmitted by the transmitters 100a and 100b, through multiplexing and MIMO demodulation.

A zero-forcing (ZF) receiver, a vertical-Bell laboratories layered space-time (V-BLAST) receiver, a maximum likelihood detection (MLD) receiver, a sub-optimal MLD receiver and so on may be used as the receivers 300a and 300b of the present invention.

The transmitters 100a and 100b and the receivers 300a and 300b of the UE and the BS may be configured in different manners depending on the procedures of processing transmitted signals and received signals.

Hereinafter, a transmitter including i transmission antennas is referred to as an i-Tx transmitter. In addition, transmission by the i-Tx transmitter is referred to as i-Tx transmission. In order to successfully receive a signal transmitted by the i-Tx transmitter, the receivers 300a and 300b must detect the signals transmitted through the i transmission antennas. That is, the receivers 300a and 300b must separate the signals through the i transmission antennas. If four transmission antennas transmit signals, the receiver must detect the four transmission antennas. Hereinafter, a receiver configured to detect the signals transmitted through the i transmission antennas is referred to as an i-Tx receiver.

A BS must communicate with a UE which enters a coverage area thereof, regardless of the number of transmission antennas included in the UE. Accordingly, the BS is required to configure various types of receivers. For example, if a 1-Tx UE, a 2-Tx UE and a 4-Tx UE are present in a wireless communication system, the BS must configure a 1-Tx receiver in order to receive an uplink signal from the 1-Tx UE, configure a 2-Tx receiver in order to receive an uplink signal from the 2-Tx UE, and configure a 4-Tx receiver in order to receive an uplink signal from the 4-Tx UE. Accordingly, a BS which may configure a 4-Tx receiver is required to configure not only a 4-Tx receiver but also a 2-Tx receiver and a 1-Tx receiver.

However, implementation of a BS which may configure various types of receivers increases complexity of receiver implementation. As a result, BS implementation and mounting costs are increased. Accordingly, UE manufacturers release UEs including a large number of transmission antennas, whereas communication providers usually use BSs with reception capabilities lower than the transmission capabilities of the released UEs. For example, although a 4-Tx UE has been released and used for wireless communication, it takes considerable time to use a BS including a 4-Tx receiver in wireless communication.

Figure 2:
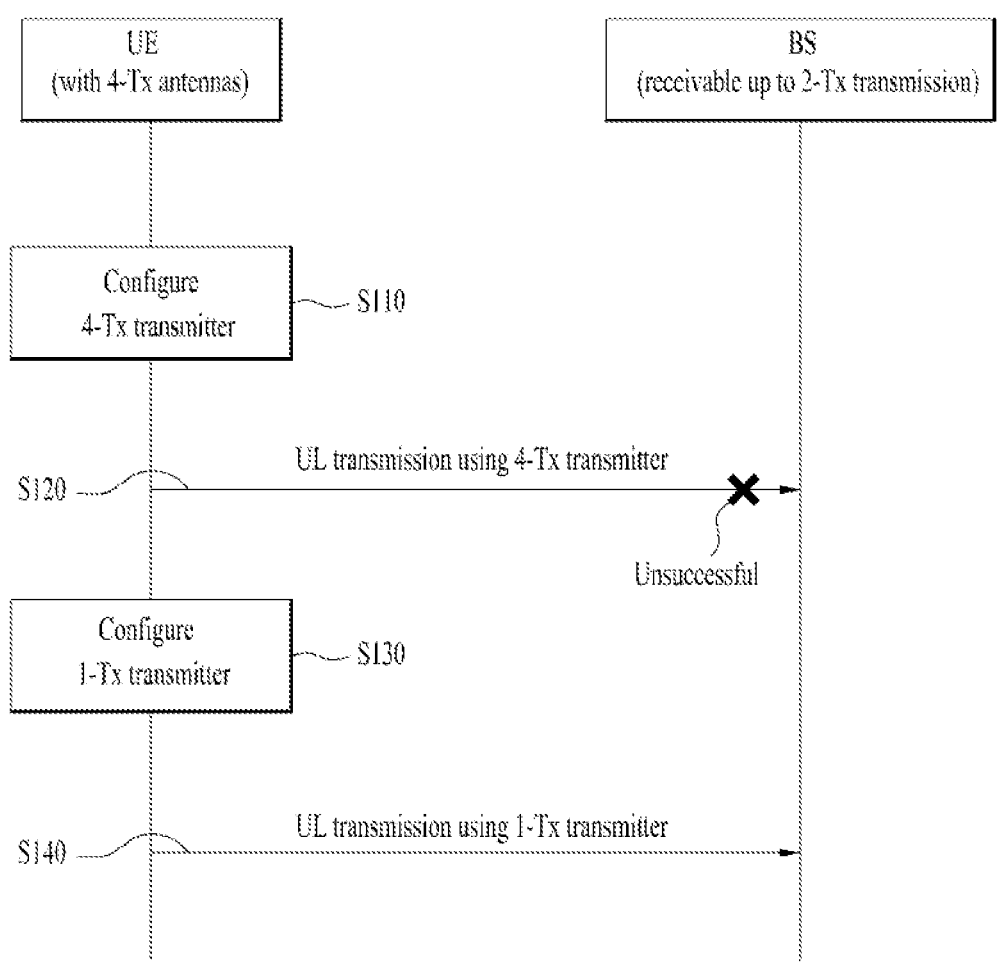
FIG. 2 is a diagram showing a method of configuring a receiver at a UE with transmission capabilities higher than reception capabilities of a BS.

FIG. 2 is a diagram showing a method of configuring a receiver at a UE with transmission capabilities higher than reception capabilities of a BS. In FIG. 2, it is assumed that the UE is a 4-Tx UE and the BS may receive an uplink signal up to 2-Tx transmission. That is, it is assumed that the UE of FIG. 2 may configure a 4-Tx transmitter and the BS may configure a 2-Tx receiver.

Referring to FIG. 2, if the 4-Tx UE operates in an MIMO mode, the 4-Tx UE configures a 4-Tx transmitter using four transmission antennas (S110). The UE transmits an uplink signal to the BS using the 4-Tx transmitter (S120). The 4-Tx transmitter may transmit a maximum of four transmission layers through a maximum of four antennas. However, since the BS of FIG. 2 receives the uplink signal through up to the 2-Tx transmission, the BS may not detect the uplink signal transmitted through the 4-Tx transmitter. The UE may receive channel state information or acknowledgement (ACK)/negative ACK (NACK) from the BS and determine that uplink signal transmission fails. Alternatively, if information is not received when information associated with the uplink signal is expected to be received from the BS, the UE determines that uplink signal transmission has failed. Using various other methods, the UE may determine that uplink transmission using the 4-Tx transmitter is not suitable for communication with the BS. In this case, the UE falls back to a transmission mode satisfying minimum transmission capacity and operates as a 1-Tx UE. That is, the UE configures a 1-Tx transmitter (S130) and communicates with the BS using the 1-Tx transmitter (S140).

As compared to MIMO transmission for transmitting different information through a plurality of antennas while using the same frequency resources, the same spatial resources and the same time resources, 1-Tx transmission has inferior information transmission capabilities. In general, the 4-Tx UE is implemented to configure not only a 1-Tx transmitter and a 4-Tx transmitter but also a 2-Tx transmitter. Accordingly, it is not preferable that the UE which may configure a 2-Tx transmitter so as to operate as a 2-Tx UE unconditionally falls back to a 1-Tx UE, in terms of wireless system performance improvement.

Figure 3:
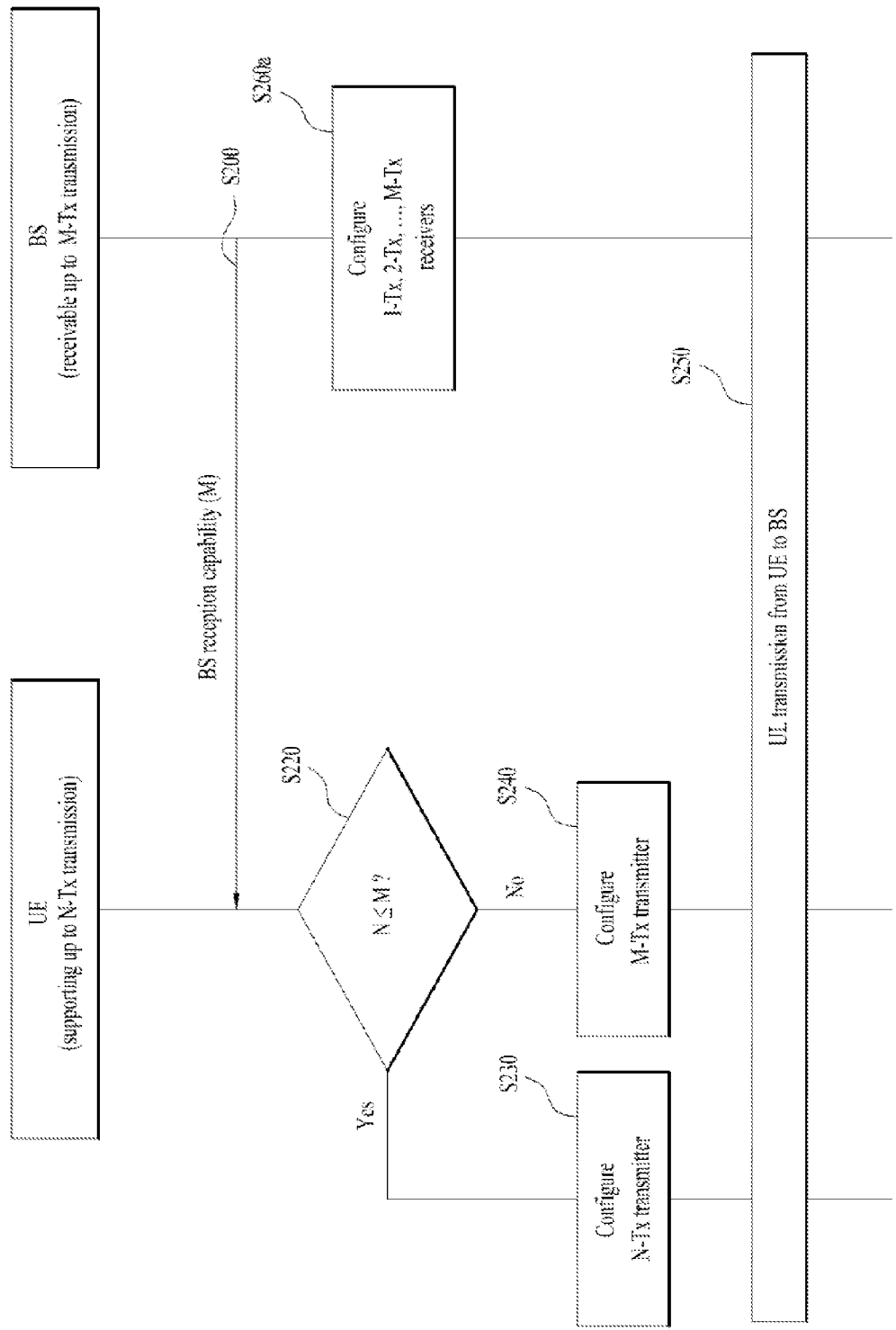
FIG. 3 is a diagram showing a method of configuring a transmitter of a UE and a method of configuring a receiver of a BS according to an embodiment of the present invention.

FIG. 3 is a diagram showing a method of configuring a transmitter of a UE and a method of configuring a receiver of a BS according to an embodiment of the present invention.

Referring to FIG. 3, the BS transmits reception capabilities of the BS in the coverage of the BS (S200). Reception capabilities include information indicating a receiver having maximum capabilities, which may be configured by the BS. For example, in the case where the BS may detect a signal transmitted from a maximum of M transmission antennas, the BS may transmit information indicating M to the UE. That is, information indicating the maximum number of transmission antennas of the UE, which may be supported by the BS, may be transmitted to the UE.

The BS may configure at least one of a 1-Tx receiver, a 2-Tx receiver, . . . , and an M-Tx receiver (S206a). For example, the BS, which may detect a signal transmitted through a maximum of four transmission antennas, may configure a 4-Tx receiver, a 2-Tx receiver and a 1-Tx receiver.

Referring to FIG. 3, the UE may receive the reception capability information from the BS (S200) and configure a transmitter within the range of the reception capabilities of the BS based on the reception capabilities (S220 to S240). For example, N which is the maximum number of transmission antennas which may be used by the UE is compared with M which is the maximum number of transmission antennas which may be detected by the BS (S220) and, if N is not greater than M, an N-Tx transmitter may be configured (S230). The UE transmits an uplink signal to the BS using the N-Tx transmitter (S250).

In contrast, if N is greater than M, since the BS cannot configure the N-Tx receiver, the receiver having maximum capacity among the receivers which may be configured by the BS becomes an M-Tx receiver. Accordingly, the UE configures an M-Tx transmitter such that the uplink signal transmitted from the UE is received using the M-Tx receiver (S240). That is, the UE operates as the M-Tx UE and transmits the uplink signal to the UE (S250).

The BS may configure all the 1-Tx receiver, the 2-Tx receiver, . . . , and the 4-Tx receiver and find a receiver having the best reception performance through a blind detection process. For example, if the quality of the signal received through the 2-Tx receiver is the best, it may be determined that the UE operates as the 2-Tx UE. If it is determined that the UE operates as the 2-Tx UE, the BS may detect the uplink signal from the UE through the 2-Tx receiver.

Figure 4:
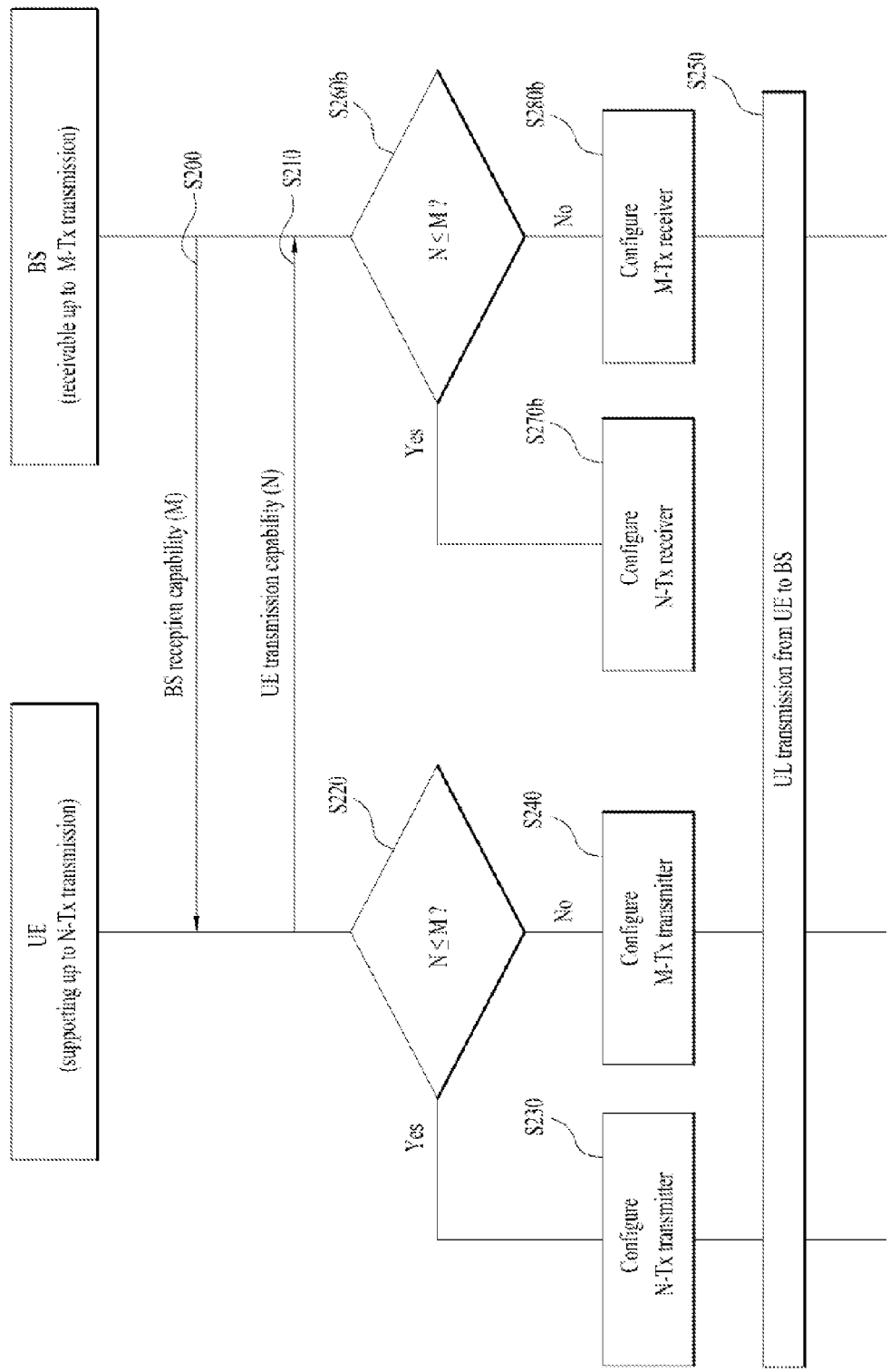
FIG. 4 is a method of configuring a transmitter of a UE and a method of configuring a receiver of a BS according to another embodiment of the present invention.

FIG. 4 is a method of configuring a transmitter of a UE and a method of configuring a receiver of a BS according to another embodiment of the present invention. Steps S200 and S220 to S250 of FIG. 4 are equal to steps S200 and S220 to S250 of FIG. 3 and thus a description thereof will be omitted.

According to the embodiment of FIG. 3, the BS determines a receiver suitable for a transmitter configured by the UE using the blind detection method. In contrast, according to the embodiment of FIG. 4, the BS configures a receiver in consideration of transmission capacity of the UE.

Referring to FIG. 4, the BS may receive transmission capacity information of the UE from the UE (S210). The transmission capacity information may include information indicating the maximum number of antennas which may be used to transmit an uplink signal by the UE. For example, if the UE may configure a transmitter having a maximum of N antennas, the UE may transmit N to the BS as the transmission capability information (S210).

The BS may configure a receiver in the reception capabilities of the BS based on the transmission capability information of the UE (S260b to S280b). For example, N which is the maximum number of transmission antennas which may be used by the UE is compared with M which is the maximum number of transmission antennas which may be detected by the BS (S260b) and, if N is not greater than M, the BS configures an N-Tx receiver (S270b). If N is not greater than M, since the UE configures an N-Tx transmitter (S230) and transmits an uplink signal through the N-Tx transmitter, the BS may successfully detect the uplink signal using the N-Tx receiver. In contrast, N, which is the maximum number of transmission antennas which may be used by the UE, is compared with M which is the maximum number of transmission antennas which may be detected by the BS (S260b) and, if N is greater than M, the BS configures an M-Tx receiver (S280b). If N is greater than M, since the UE configures an M-Tx transmitter (S230) and transmits an uplink signal through the M-Tx transmitter, the BS may successfully detect the uplink signal using the M-Tx receiver.

The processor 400b of the BS of the present invention may control the transmitter 100b of the BS to transmit information indicating reception capabilities of the BS to the UE.

The processor 400a of the UE of the present invention may control the transmitter 100a of the UE to perform i-Tx transmission based on BS reception capabilities and UE transmission capabilities received from the BS. That is, the processor 400a of the UE of the present invention may control the transmitter 100a of the UE to configure an i-Tx transmitter in consideration of BS reception capabilities and UE transmission capabilities. Here, i may be set to an integer maximum which is not greater than M or N.

The processor 400b of the BS of the present invention may detect an i-Tx receiver which may detect a signal transmitted from the i-Tx transmitter. The processor 400b of the BS may configure a 1-Tx receiver, . . . , and an M-Tx receiver and determine a receiver having the best reception performance as a receiver used for the UE. The processor 400b of the BS may control the receiver 300b of the BS to configure a receiver corresponding to a transmitter for maximizing transmission capabilities of the UE. Here, i may be set to a maximum integer which is not greater than M or N. The processor 400a of the UE of the present invention may control the transmitter 100a of the UE to transmit UE transmission capabilities to the BS.

Hereinafter, an example of applying the present invention to the 3GPP LTE/LTE-A system will be described. However, the present invention is not limited thereto. For example, although a mobile communication system is described based on a mobile communication system corresponding to the 3GPP LTE/LTE-A system in the following description, the present invention is applicable to other mobile communication systems excluding unique items of 3GPP LTE/LTE-A.

The UE having multiple antenna ports may be configured in a single antenna port mode and a multiple antenna port mode. If the UE is configured in the single antenna port mode, the UE operates as a 1-Tx UE regardless of the number of antenna ports included in the UE. If the UE is configured in the multiple antenna port mode, the number of antenna ports used for uplink transmission by the UE is restricted by reception capabilities of the BS. In particular, if the number N of antenna ports of the UE is greater than the number M of antenna ports which may be detected by the BS, the number of antenna ports used for uplink transmission by the UE is restricted by reception capabilities of the BS.

The configuration of the transmitter according to a physical uplink shared channel (PUSCH) transmission mode is as follows.

TABLE 1

| PUSCH transmission mode | DCI formats | Characteristics of transmission scheme |
|---|---|---|
| Single antenna port mode | 0 | A single antenna port for demodulation, 3GPP LTE Release-8 transmission supported |
| Multiple antenna port mode | 0 | A single antenna port for demodulation, 3GPP LTE Release-8 transmission supported |
| | New multiple antenna port DCI | Up to 4 precoded DMRS antenna ports. The number of antenna port is |

TABLE 1-continued

| PUSCH transmission mode | DCI formats | Characteristics of transmission scheme |
|---|---|---|
| | format | defined according to BS reception capabilities (2Tx, 4Tx) |

In Table 1, a demodulation antenna port or a DMRS antenna port refers to an antenna port for transmitting a demodulation reference signal.

The UE which operates in the single antenna port mode performs uplink transmission using one demodulation antenna port. Alternatively, for PUSCH transmission scheduled by a downlink control information (DCI) format 0 received from the BS, the UE performs uplink transmission using one demodulation antenna port. That is, the UE configures a 1-Tx receiver.

The UE which may configure four DMRS antenna ports transmits a PUSCH using two antenna ports if reception capabilities of the BS are 2Tx and transmits a PUSCH using four antenna ports if reception capabilities of the BS are 4Tx.

As another example, if the number of antenna ports of the UE is 2, sounding reference signal (SRS) antenna ports may be configured as shown in Table 2. If the number of antenna ports of the UE is four, SRS antenna ports may be configured as shown in Table 3. The SRS antenna port refers to an antenna port used for SRS transmission.

TABLE 2

| Number of SRS antenna ports at 2-Tx UE |
|---|
| Off |
| 1 |
| 2 |

TABLE 3

| Number of SRS antenna ports at 2-Tx UE |
|---|
| Off |
| 1 |
| 2 or 4 |
| (according to BS reception capabilities) |

Referring to Table 3, the UE having four antenna ports may configure a single antenna port or antenna ports of corresponding in number to reception capabilities of the BS, for SRS transmission.

According to the present invention, even when reception capabilities of the BS do not match transmission capabilities of the UE and thus the UE including multiple antennas may not use a maximum number of transmission antennas, the UE does not unconditionally fall back to a 1-Tx UE. Instead, the UE operates to maximize transmission capabilities within reception capabilities of the BS. For example, if the 4-Tx UE is connected to the BS which may receive an uplink signal through up to 2-Tx transmission, the UE may configure a 2-Tx transmitter so as to perform MIMO transmission.

Accordingly, according to the present invention, it is possible to improve system performance and throughput of a wireless communication system.

The embodiments of the present invention can be applied to a BS, a UE, or other communication devices in a wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving, at a base station, an uplink signal from a user equipment having N (N being an integer greater than 1) transmission antennas, the method comprising:
   transmitting reception capability information of the base station to the user equipment, the reception capability information including information indicating that the base station may receive a signal transmitted through a maximum of M transmission antennas, where M is an integer greater than 1; and
   configuring at least one of a first receiver for receiving the uplink signal transmitted through one transmission antenna, a second receiver for receiving the uplink signal transmitted through two transmission antennas, . . . , and an M-th receiver for receiving the uplink signal through M transmission antennas.

2. The method according to claim 1, further comprising:
   receiving, from the user equipment, information indicating N which is the number of transmission antennas of the user equipment; and
   configuring an N-th receiver if N is not greater than M and configuring an M-th receiver if N is greater than M.

3. The method according to claim 1, further comprising receiving the uplink signal from the user equipment using the configured receiver.

4. A base station which receives an uplink signal from a user equipment having N transmission antennas, where N is an integer greater than 1, comprising:
   a transmitter;
   a receiver; and
   a processor configured to control the transmitter and the receiver,
   wherein the processor controls the transmitter to transmit reception capability information of the base station to the user equipment, the reception capability information including information indicating that the base station may receive a signal transmitted through a maximum of M transmission antennas, where M is an integer greater than 1, and
   wherein the processor controls the receiver to configure at least one of a first receiver for receiving the uplink signal transmitted through one transmission antenna, a second receiver for receiving the uplink signal transmitted through two transmission antennas, . . . , and an M-th receiver for receiving the uplink signal through M transmission antennas.

5. The base station according to claim 4, wherein the processor controls the receiver to receive, from the user equipment, information indicating N which is the number of transmission antennas of the user equipment, and controls the receiver to configure an N-th receiver if N is not greater than M and to configure an M-th receiver if N is greater than M.

6. The base station according to claim 4, wherein the processor controls the receiver to receive the uplink signal from the user equipment.

* * * * *